(12) United States Patent
Barrero Gil et al.

(10) Patent No.: US 9,541,058 B2
(45) Date of Patent: Jan. 10, 2017

(54) ENERGY CONVERTERS AND ENERGY CONVERSION SYSTEMS

(71) Applicants: REPSOL, S.A., Madrid (ES); UNIVERSIDAD POLITÉCNICA DE MADRID, Madrid (ES)

(72) Inventors: Antonio Barrero Gil, Madrid (ES); Angel Gerardo Velazquez Lopez, Madrid (ES); Juan Ramón Arias Perez, Madrid (ES); Óscar Prieto Acedo, Móstoles (ES); David Vicente Ludlam, Madrid (ES); Ji Xu Xu, Madrid (ES)

(73) Assignees: REPSOL, S.A., Madrid (ES); UNIVERSIDAD POLITÉCNICA DE MADRID, Madrid (ES)

( * ) Notice: Subject to any disclaimer, the term of this patent is extended or adjusted under 35 U.S.C. 154(b) by 0 days.

(21) Appl. No.: 14/651,210

(22) PCT Filed: Nov. 29, 2013

(86) PCT No.: PCT/EP2013/075118
§ 371 (c)(1),
(2) Date: Jun. 10, 2015

(87) PCT Pub. No.: WO2014/090603
PCT Pub. Date: Jun. 19, 2014

(65) Prior Publication Data
US 2015/0330358 A1    Nov. 19, 2015

(30) Foreign Application Priority Data
Dec. 12, 2012   (ES) .................................. 201231930

(51) Int. Cl.
*F03B 13/00*    (2006.01)
*F03B 17/06*    (2006.01)
*F03D 5/06*    (2006.01)

(52) U.S. Cl.
CPC ............... *F03B 17/06* (2013.01); *F03B 13/00* (2013.01); *F03D 5/06* (2013.01); *F05B 2240/97* (2013.01); *Y02E 10/28* (2013.01); *Y02E 10/70* (2013.01)

(58) Field of Classification Search
CPC ....................................................... F03B 17/06
(Continued)

(56) References Cited

U.S. PATENT DOCUMENTS 3,995,972 A * 12/1976 Nassar ...................... F03D 5/06
415/2.1
4,184,805 A * 1/1980 Arnold ...................... F03D 5/06
416/1

(Continued)

FOREIGN PATENT DOCUMENTS

EP    0 683 316    11/1995
EP    0 927 304    3/1998
(Continued)

OTHER PUBLICATIONS

International Search Report for PCT/EP2013/075118, mailed Mar. 28, 2014, 12 pgs.
(Continued)

*Primary Examiner* — Joseph Waks
(74) *Attorney, Agent, or Firm* — Squire Patton Boggs (US) LLP

(57) ABSTRACT

An energy converter for converting kinetic energy from a body of liquid by transverse galloping includes a support, an elongate galloping body extending between a first end and a second end and being of a suitable cross-section for trans-
(Continued)

verse galloping, a substantially horizontal guide arranged outside the body of liquid for guiding the first end of the galloping body, one or more elastic means substantially horizontally arranged and connected between the galloping body and the support, and a generator including a static generator component and a dynamic generator component, and wherein the galloping body is substantially vertically suspended such that the second end of the body extends into the body of liquid, and the dynamic generator component is operationally connected to the galloping body. Further disclosed are energy conversion systems including a plurality of energy converters and methods for energy conversion.

20 Claims, 6 Drawing Sheets

(58) Field of Classification Search
USPC .......................................................... 290/54
See application file for complete search history.

(56) References Cited

U.S. PATENT DOCUMENTS

| | | | |
|---|---|---|---|
| 4,549,035 A | 10/1985 | Zaltsberg | |
| 4,777,327 A | 10/1988 | Richardson, Jr. | |
| 6,273,680 B1* | 8/2001 | Arnold | F03B 17/00 |
| | | | 416/1 |
| 6,424,079 B1 | 7/2002 | Carroll | |
| 7,208,845 B2 | 4/2007 | Masters et al. | |
| 7,986,051 B2 | 7/2011 | Frayne | |
| 8,350,394 B2 | 1/2013 | Cottone et al. | |
| 9,222,465 B2* | 12/2015 | Thorp | F03D 9/002 |
| 2005/0230973 A1* | 10/2005 | Fripp | E21B 41/0085 |
| | | | 290/1 R |
| 2005/0230974 A1* | 10/2005 | Masters | E21B 41/0085 |
| | | | 290/1 R |
| 2006/0064972 A1* | 3/2006 | Allen | F03D 5/00 |
| | | | 60/369 |
| 2008/0004855 A1 | 1/2008 | Sakai | |
| 2009/0121489 A1 | 5/2009 | Kawai | |
| 2010/0143115 A1 | 6/2010 | Kerr | |
| 2012/0292915 A1* | 11/2012 | Moon | F01D 5/00 |
| | | | 290/55 |
| 2014/0001761 A1* | 1/2014 | Weiland | F03B 13/10 |
| | | | 290/54 |
| 2014/0175800 A1* | 6/2014 | Thorp | F03D 9/002 |
| | | | 290/55 |

FOREIGN PATENT DOCUMENTS

| | | |
|---|---|---|
| EP | 1 812 709 | 5/2006 |
| JP | 2001-157433 | 6/2001 |
| JP | 2006-226221 | 8/2006 |
| JP | 2010-096077 | 4/2010 |
| JP | 2011-140894 | 7/2011 |
| WO | WO 2011/050294 | 4/2011 |
| WO | WO 2012/066550 | 5/2012 |
| WO | WO 2012/142563 | 10/2012 |

OTHER PUBLICATIONS

Barrero-Gil et al., "Energy Harvesting from Transverse Galloping", Journal of Sound and Vibration 329, 14, pp. 2873-2883 (2010).
Barrero-Gil et al., "Hysteresis in Transverse Galloping: The role of inflection points", Journal of Fluids and Structures 25, 6, pp. 1007-1020 (2009).
Barrero-Gil et al., "Transverse Galloping at low Reynolds numbers", Journal of Fluids and Structures 25, 7, pp. 1236-1242 (2009).
Bouclin, "Hydroelastic oscillations of square cylinders", Thesis, University of British Columbia, 90 pgs. (1975).
El-Hami et al., "Design and Fabrication of a new vibration-based electromechanical power generator", Sensors and Actuators A 92 pp. 335-342 (2001).
Novak et al., "Effect of turbulence on galloping stability", ASCE Journal of the Engineering Mechanics division 100, pp. 27-47 (1974).
Sarpkaya, "A critical review of the intrinsic nature of vortex-induced vibrations", Journal of Fluids and Structures 19, pp. 389-447 (2004).
Simiu and Scanlan, "Wind Effects on Structures", Wiley and Sons, pp. 206-213 (1978).
Tang X. et al., "Enhanced vibration energy harvesting using dual-mass systems", Journal of Sound and Vibration 330, pp. 5199-5209 (2011).
Williamson et al., "Vortex-Induced Vibrations", Annual Review of Fluid Mechanics 36, pp. 413-455 (2004).

* cited by examiner

ENERGY CONVERTERS AND ENERGY CONVERSION SYSTEMS

The present disclosure relates to energy converters and energy conversion systems. The present disclosure more particularly relates to energy converters and systems for converting kinetic energy of a fluid flow to electricity using "Transverse Galloping".

BACKGROUND

Flow induced vibrations (FIVs) have a high interest in many fields of technology and engineering. The main reason for this is that they can have a dangerous effect on structures. They can potentially generate an unacceptable level of oscillations in a structure, which may put the integrity and/or functionality of the structure at risk. Historically, engineers and scientists have therefore tried to prevent FIVs and/or minimize their effects. However, recently it has been shown that some FIVs can be used to extract energy from the flow.

Examples of the present invention are based on the use of a flow induced vibration phenomenon that is generally called Transverse Galloping (TG). Other Flow Induced Vibrations, such as e.g. the phenomenon of Vortex-Induced Vibrations (VIV) or Flutter, have in the past also been considered for energy conversion and electricity production.

Vortex Induced Vibrations:

When an elastic bluff body is under the action of a steady fluid flow, for high enough Reynolds numbers (higher than 50, say) the flow separates from the body surface generating an unsteady broad wake. Typically, the flow pattern is characterized by two shear layers on each side of the body that are unstable and roll up to form vortices. These vortices are shed to the wake periodically with a frequency proportional to the undisturbed flow speed. There is a flow velocity at which vortex shedding has a frequency close to the body's natural frequency of oscillations and, for low enough values of the mass and mechanical properties, significant oscillations can be induced in the body. When the body is oscillating, a complex interaction between the oscillating body and the flow field around it develops. This non-linear resonance phenomenon is known as Vortex-Induced Vibration (VIV). The kinetic energy of the oscillations can theoretically be transformed into electricity through the use of an electrical converter. Examples of energy conversion devices partly or complete based on vortex induced vibrations have been described in U.S. Pat. No. 7,208,845, WO 2012/066550 and U.S. Pat. No. 6,424,079.

At least one disadvantage related to energy converters based on vortex induced vibrations is that only in a relatively narrow range of fluid flow speed, resonance occurs. Thus, relatively good energy conversion efficiency can only be reached in a very narrow range of fluid flow speed. Furthermore, the peak amplitude of oscillation (which directly or indirectly drives the electricity production) is inherently limited.

Flutter:

Flutter is a flow induced vibration affecting streamlined flexible bodies. It is a flow induced instability (not a resonance like VIV) and usually involves oscillations in two degrees of freedom, e.g. transverse to the incident flow as well as torsional (pitch). Flutter generally is a high frequency phenomenon of oscillations of relatively small amplitude. E.g. US 2009/0121489 and U.S. Pat. No. 7,986,051 describe energy converters utilizing flutter.

One disadvantage related to energy conversion based on the phenomenon of flutter is that it is a high frequency phenomenon which causes oscillations of small amplitude. This in itself can make electricity production complex. Moreover, the influence of the Reynolds number (which indicates the ratio of inertia forces and viscous forces in the flow) in the oscillations is very significant. This means that relatively good energy conversion efficiency can only be reached for specific flow conditions.

Galloping and Transverse Galloping:

Galloping is a well-known phenomenon in the field of Civil Engineering. It can commonly be observed in high-tension electric transmission lines when the ice accretion on the wires modifies the original substantially circular cross-sections of the transmission lines. A wake caused by a first transmission line may cause a downstream transmission line to start galloping. This phenomenon is commonly called "Wake Galloping".

In slender structures with a relatively low mass, a low damping coefficient, and having a suitable shape or cross-section (such as e.g. rectangular, triangular or an open semi-circular shape (C-shape), or a D-shape) transverse galloping can occur when the velocity of the incident flow exceeds a certain critical value. At flow speeds above this critical value, the stabilizing effect of structural (mechanical) damping is overcome by the destabilizing effect of the fluid force, and a small transverse displacement of the body creates a fluid force in the direction of the motion that tends to increase the amplitude of vibration. Once the instability threshold is exceeded, an oscillatory motion (which is mainly transverse to the flow) develops with increasing amplitude until the energy dissipated per cycle by mechanical damping balances the energy input per cycle from the flow.

Amplitude and frequency of steady oscillations depend on the geometrical and mechanical properties of the body (cross-sectional shape, mass, natural oscillation frequency and mechanical damping) as well as the incident flow velocity. With increasing flow velocity, the amplitude of the oscillations increases keeps on increasing, and at least in theory, there is no upper limit.

One significant advantage of Galloping for energy conversion and electricity production with respect to e.g. Vortex Induced Vibrations, is that the oscillations do not merely occur in a limited range of flow velocity, but instead they occur at any flow speed above the critical flow speed. Furthermore, the amplitudes of the oscillations in Galloping may be relatively large whereas in Vortex Induced Vibrations they may be relatively small. The ratio of amplitude/characteristic length of the galloping body may reach 3 or 5 or 10. The characteristic length of the body may e.g. be the width of the cross-section of the body. For vortex induced vibrations, a maximum possible amplitude may be given for this ratio around 1.

Another relevant aspect is that the flow speed at which transverse galloping occurs depends strongly of the mechanical properties of the galloping body. As a general rule, the lower the mass and mechanical damping are, the lower the critical flow speed is for galloping. For the purpose of energy efficiency, this is a great advantage, because to some extent one can control (e.g. by of the appropriate choice of mechanical properties) the flow speed at which galloping will take place.

Furthermore, Transverse Galloping is much less dependent on Reynolds numbers than other flow induced vibrations herein described. This means that the energy converters based on Transverse Galloping may more easily be increased in scale.

Previous theoretical studies developed by the inventor Barrero-Gil (Barrero-Gil et al. *Transverse Energy harvesting from Galloping, Journal of Sound and Vibration* 329.14 (2010), 2873-2883) have highlighted that, in principle, it is possible to efficiently transfer energy from a fluid flow to a prism.

JP 2006-226221 discloses energy converters based on transverse galloping. A vibration body is cantilever mounted and electricity generation is based on deformation of piezo electric materials. At least one disadvantage related to this arrangement is that it would be difficult and/or expensive to reach a large scale energy conversion.

Previously, "*Hydroelastic Oscillations of square cylinders*", Denis N. Bouclin, University of Toronto, 1975, studied the interaction between vortex shedding and galloping type oscillations of square cylinders immersed in a water stream. Bouclin did not recognise the possibilities for energy extraction from a fluid flow using transverse galloping. Rather, the idea behind Bouclin's research was to examine the phenomenon in order to be able to avoid negative effects of transverse galloping. Even if the possibility of energy harvesting had been recognised, the experimental set-up would hardly have been useful for this purpose. In the experiments carried out by Bouclin, an oscillating square cylinder is guided along a guide using air bearings with relatively low mechanical damping coefficient. The square form of the cylinder is also not optimized for transverse galloping. Furthermore, the ratio of densities m*= $\rho_{galloping\ body}/\rho_{fluid}$ would not have been suitable for this purpose either.

The present disclosure relates to various methods and systems for improving energy conversion (and electricity production) based on Transverse Galloping vibrations.

SUMMARY

In a first aspect, an energy converter for converting kinetic energy from a body of liquid by transverse galloping is provided. The energy converter comprises a support, an elongate galloping body extending between a first end and a second end and being of a suitable cross-section for transverse galloping, a substantially horizontal guide arranged outside the body of liquid for guiding the first end of the galloping body, one or more elastic means substantially horizontally arranged and connected between the galloping body and the support, and a generator comprising a static generator component and a dynamic generator component. The galloping body is substantially vertically suspended such that the second end of the body extends into the body of liquid, and the dynamic generator component is operationally connected to the galloping body.

According to this aspect, a substantially linear oscillating movement of the galloping body may be achieved. This linear oscillation may be of relatively large amplitude, which can facilitate energy conversion to electricity, since conventional generator types may be used. Since the galloping body is vertically suspended, and performs a horizontal movement, the generator and other critical components may be arranged outside of the body of liquid. The body of liquid may typically be a sea, ocean or river. By arranging critical components outside the liquid (e.g. salt sea water), wear and tear (e.g. corrosion) of such components may be avoided or reduced.

An advantage of using a liquid (e.g. water) flow instead of an air flow is that the liquid flow may be less variable over time and more predictable. The galloping body may thus reliably be tuned for a specific liquid flow and site. Another advantage is that the density of a liquid may generally be much higher than that of air making Transverse Galloping more pronounced and additionally, the energy content of a liquid (water) flow is higher than that for an airstream at the same flow speed.

Based on a linearized (i.e. simplified) analysis, suitable cross-section (or suitable shape) for galloping in this respect may be simplified as a cross-section that gives such a shape that the "Den Hartog" criterion is satisfied:

$$\left(\frac{dC_L}{d\alpha} + C_D\right) < 0,$$

wherein $C_L$ is the lift coefficient, $C_D$ is the drag coefficient and $\alpha$ is the angle of attack.

In some embodiments, the elastic means may be spring means. For example, one or more springs may be attached to a part of the galloping body on one end of a spring and to the support structure at the other end of the spring. The elastic means could also be formed e.g. by a suitable elastic material which may be stretched during motion.

The galloping body may generally be or comprise a prism.

In some examples, the support may be floating in the body of liquid. The support (e.g. a platform) may be anchored/tethered at the sea bed or river bed or otherwise be connected to a suitable point at e.g. a river shore. In other examples, the support structure may be fixed. The support structure may be fixed at a river or sea bed using e.g. a monopile structure or another pile structure on a foundation in the river or sea bed. In another example, the support structure could comprise legs which are positioned on either side of a river.

In some examples, the dynamic generator component is integrally formed with or attached to the galloping body. The galloping body may thus directly drive the generator (or a transmission between generator and galloping body). For example, a kart may be attached at the first end of the galloping body, whereby the kart may be guided along the horizontal guide.

In other examples, the dynamic generator component may be a second body connected to the support by one or more elastic means. These elastic means may once again be springs or other. As is known, the oscillation of one body can be reduced by elastically connecting another body to it. For example, systems using Tuned Mass Dampers are based on this principle. By appropriately choosing the mass and stiffness (elasticity) of the connection of the second body, unwanted oscillations may be reduced or avoided. However, when designed appropriately, a secondary body (or secondary mass) can also be used to improve the energy conversion (rather than decrease oscillations) with respect to a single body system. In these examples, the second body may be used to drive the generator. By correctly matching the mass of the second body as well as the elastic connection between the galloping body and the second body, improved energy conversion efficiency may be reached.

An improvement in energy conversion efficiency could similarly be reached in energy converters wherein the galloping body itself drives the generator (or the transmission in between galloping body and generator) and wherein such a second body is elastically coupled to the galloping body. The gains that may be achieved by incorporating the second body (second mass) depend again on the mass of the second body (in comparison to the mass of the first body), and the elastic connection between the first and second bodies.

In some embodiments, at least a part of the galloping body (e.g. a prism) may be rotatable around a longitudinal axis of the galloping body and the energy converter further comprises an actuator for rotating the rotatable part. Optionally the galloping body may comprise an upper part and a lower part, and wherein the lower part is rotatably mounted about the upper part. During standard galloping oscillations, the angle of attack of the galloping body with respect to the incident flow changes continuously (as well as the fluid force along the direction of the oscillation). There is an angle of attack for which the fluid force along the direction of the oscillation is maximum and the energy transfer between the fluid force and the oscillating body is also maximum. The inventors have found that energy conversion may be enhanced by substantially continuously adapting the pitch angle of the lower part of the galloping body, i.e. the part of the galloping body in contact with the liquid so that the optimum angle of attack may be ensured during increased periods of time or substantially at all times.

Also, in these embodiments, the galloping body may relatively easily be adapted for a change in flow direction (e.g. a tidal flow). In other embodiments, the support structure could be rotatable or adaptable to adjust to changing flow conditions.

In some embodiments, the energy converter may comprise a pitch control system for sending commands to the actuator, wherein said commands are based on measurements of the position and/or velocity of the galloping body and flow velocity of the liquid body. In one example, the energy converter may include sensors to measure displacement and/or velocity of the galloping body. These sensors could be laser based, or suitable accelerometers could be used. In some examples, both a location and a velocity may be measured separately. In other examples, one of these (location or velocity) may be directly measured and the other (velocity or location) may be derived from this measurement.

Additionally, suitable sensors to measure the liquid flow speed (e.g. flow meters) may be used. In an alternative example, the liquid flow speed may be assumed to be a known constant. A micro-processor may process the data from the sensor(s) and send suitable commands to the actuator, e.g. a servomotor.

In some embodiments, the galloping body may be substantially hollow. The mass/density of the galloping body has a significant influence on the galloping motion. Based upon knowledge of the liquid flow field, a suitable mass/density may be determined. According to the desirable mass/density, it may be decided to make the galloping body substantially hollow.

In some embodiments, the galloping body further comprises an end-plate at its second end, which may be substantially flat. Such a (flat) end-plate may reduce detrimental fluid-dynamic effects around the bottom of the galloping body.

In some embodiments, the cross section of the galloping body may be variable between the first end and the second end. In some examples, the shape of the cross-section of the galloping body is substantially constant between the first end and the second end, but the cross-section has variable dimensions. Depending on the body of liquid in which the galloping body is suspended an effect of velocity shear (i.e. a varying velocity of the liquid as a function of the depth) may occur. To compensate for such shear effects, the cross-section of the galloping body may be adapted such that each section contributes to galloping in substantially the same amount.

In some embodiments, the cross-section of the galloping body may have substantially a C-shape. In laboratory experiments carried out by the inventors, it was surprisingly found that the C-shape for the galloping body leads to very favourable results, when the liquid flow impinges upon the open side of the C-shape.

In some embodiments, the resistance of the generator may be variable. The galloping movement and conversion efficiency is influenced by the damping coefficient of the galloping structure. By changing the resistance (electromagnetic force applied by the generator to the galloping body directly or indirectly), the conversion efficiency may be influenced.

In another aspect, an energy conversion system is provided comprising a plurality of energy converters according to any of the embodiments substantially as hereinbefore described.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1:
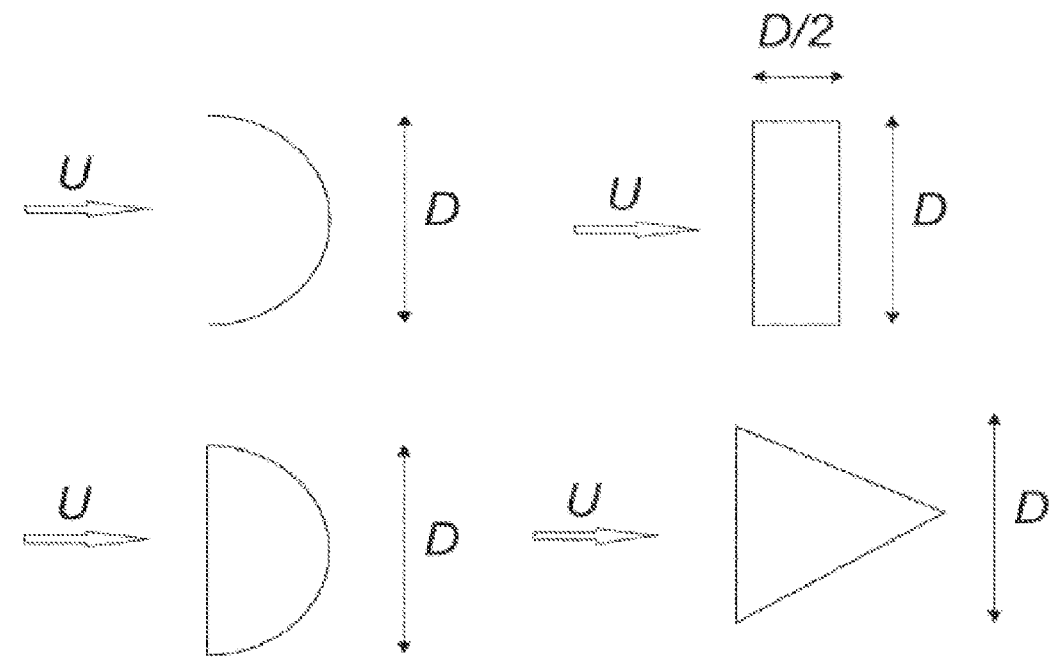
FIG. 1 illustrates various suitable cross-sections for galloping bodies according to different examples of the present invention.

FIG. 1 schematically illustrates just some examples of shapes that are suitable for transverse galloping. Illustrated examples in FIG. 1 include a C-shape, a rectangular shape, a (closed) semi-circular shape and a triangular shape. Reference sign U indicates the direction of flow in which the galloping body may be suspended, whereas reference sign D indicates the dimension of the galloping body (or prism) in the transverse direction (normal to the flow).

Figure 2:
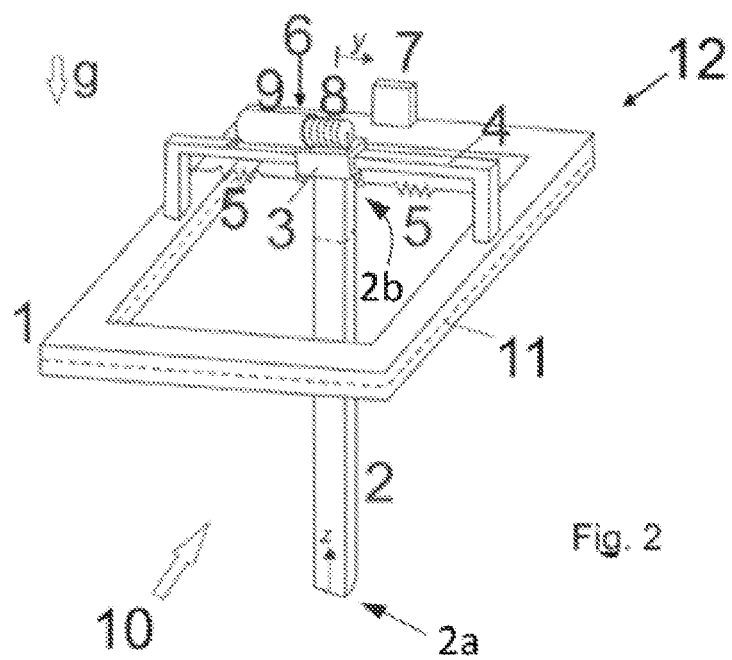
FIG. 2 illustrates an energy converter according to an example of the present invention.

FIG. 2 schematically illustrates a first example of an energy converter according to the present invention. The energy converter 12 comprises a support structure 11, which may be floating and may be anchored/tethered to e.g. a sea bed or river bed. In another example, the support structure could be fixed.

A galloping body 2 in the shape of a prism may be vertically suspended from the support. The galloping body 2 has a top end (first end 2a) and a bottom end (second end 2b). The galloping body 2 is connected on either side to the support structure through suitable springs 5. In other examples, alternative elastic means could be used. In a further alternative, a single spring could also be used (i.e. a spring structure only on one side of the galloping body). The galloping body could have any suitable cross-section for galloping, in particular it could have any of the shapes previously described.

At a first end (outside the body of liquid) of the galloping body, a kart 3 is connected which is guided along a horizontal guide 4. The horizontal guide may be supported on the support 12 by two support legs, one at each end as schematically illustrated in FIG. 2. In this example, even if the support 12 is floating in the body of liquid then still the horizontal guide may be arranged outside the body of liquid.

The resulting galloping motion may be a substantially horizontal oscillating motion. In the illustrated examples, the springs are connected to the kart 3.

Furthermore, an electric generator is provided. The electric generator may take any suitable form and may be e.g. linear or rotary. A dynamic generator component (e.g. a rotor) may be driven by the kart 3. In case of rotary motion of the generator, a suitable transmission for transforming the horizontal oscillating motion into circular motion may be provided. For example, a crank and a flywheel may be used in order to employ a conventional rotary generator. In the illustrated example of FIG. 2, the kart 3 supports one or more coils 8 and the static part of the component is a permanent magnet 9. The relative motion of the coil with respect to the magnetic field may induce currents in the coils. In another advantageous example, the coil may be a static component of the generator, whereas the galloping body 2 (or in this case, the kart 3) carries the permanent magnets.

In some embodiments, the electric generator may be replaced with other means for energy conversion such as e.g. a compressor.

Further very schematically illustrated in FIG. 2 is a control unit 7. The control unit 7 may comprise a microprocessor which receives input from sensors on the liquid flow velocity and/or the oscillating motion. Based on this input, a control of the generator could be adapted to vary the electromagnetic resistance. In the case of a rotary generator, the generator torque may be adapted using known electronic components, such as converters.

It is to be noted that only the galloping body and a part of the platform 11 is in contact with the body of liquid. The generator 6, and other critical components such as e.g. the horizontal guide 4 or the control unit 7 are outside the body of liquid. The friction of the horizontal guide may thus more easily be minimized. And sensitive (electric) components are much more protected from e.g. corrosion.

The average power transferred from the liquid flow with a velocity U to the oscillating galloping body is given by:

$$P = \rho U^3 DL\eta/2, \quad \text{(Eq. 1.1)}$$

wherein $\eta$ is the efficiency of the transfer of energy, D is a characteristic transverse dimension of the galloping body (e.g. the width) $\rho$ is the density of the liquid and L is the submerged length of the galloping body.

As further explained in the publications Barrero-Gil et al. ("*Transverse Galloping at low Reynolds numbers*", *Journal of Fluids and Structures* 25, 7 (2009), 1236-1242), Barrero-Gil et al. ("*Hysteresis in Transverse Galloping: The role of inflection points.*" *Journal of Fluids and Structures* 25,6 (2009), 1007-1020), and as explained in Barrero-Gil et al. ("*Transverse Energy harvesting from Galloping, Journal of Sound and Vibration* 329.14 (2010), 2873-2883") the normalized amplitude of the galloping motion in a steady-state operation is given by:

$$A^* = \left(\frac{4U^*}{3a_3}(4m^*\xi - a_1 U^*)\right)^{\frac{1}{2}}, \quad \text{(Eq. 1.2)}$$

and the efficiency of the transfer of energy is given by:

$$\eta = 2a_1\left(\frac{4m^*\xi - a_1 U^*}{3a_3 U^*}\right) + 6a_3\left(\frac{4m^*\xi - a_1 U}{3a_3 U^*}\right) \quad \text{(Eq. 1.3)}$$

Herein $a_1 > 0$ and $a_3 < 0$ are constants which characterize the liquid flow around the galloping body which depend on the shape of the galloping body; m* is the ratio between the density of the liquid and the density of the galloping body, $\xi$ is an non-dimensional mechanical damping coefficient of the galloping body and U* ("reduced velocity") is given by the following equation:

$$U^* = \frac{U}{\omega_n D},$$

wherein $\omega_n$ is the natural oscillation frequency of the galloping body (at rest and in air).

It may be noted that for values $U^* > U_G^* = 4\ m^*\xi/a_1$ transverse galloping occurs ($A^* > 0$ and $\eta > 0$). U* herein may be regarded as the critical velocity of the liquid flow to cause transverse galloping.

Equation 1.3 determines the efficiency of transfer of energy as a function of the mechanical and geometric properties of the galloping body, and the velocity of the incident liquid flow. Based upon Equation 1.3 one may derive that the maximum efficiency that can be reached is given by $$\eta_{max} = -\frac{a_1^2}{6a_3} \quad \text{(Eq. 1.4)}$$

In the following, some considerations concerning the design and control to maximize energy conversion are given. If the efficiency of the generator is $\eta_E$, then the electrical power generated is given by:

$$P_E = \rho U^3 DL\eta\eta_E/2 \quad \text{(Eq. 1.5)}$$

Figure 3:
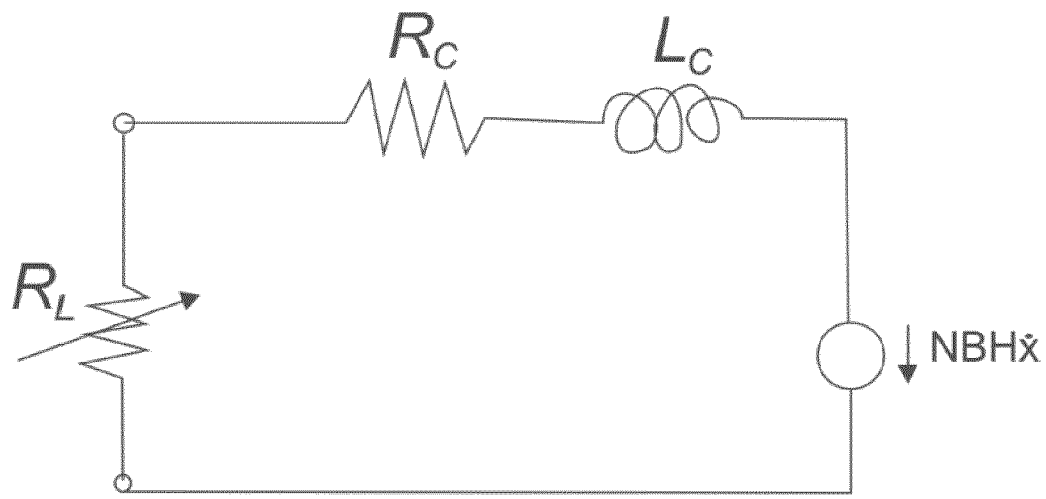
FIG. 3 schematically illustrates a variable resistance of a generator which may be used in some examples of the present invention.

In the case of linear electromagnetic generation with a coil of length H, having N turns, a magnetic field B, an electrical resistance $R_C$, an electrical resistance of the load $R_L$ (see also FIG. 3, in which a circuit representing the electromagnetic generator is schematically illustrated), and wherein an angular frequency is small (which means that the effect of inductance $L_C$ may be disregarded), the electrical power is given by:

$$P_E = \frac{1}{T} \int R_L i^2 dt, \quad \text{(Eq. 1.6)}$$

wherein

T is a time period for averaging and i is the current flowing through the load resistance.

The current is given by:

$$i = \frac{(NBH)\dot{x}}{(R_L + R_C)}, \quad \text{(Eq. 1.7)}$$

wherein $\dot{x}$ is the oscillating velocity of the coil relative to a magnet (or vice versa). If one assumes that the relative velocity between coil and magnet is equal to the galloping velocity $\dot{y}$, then $$P_E = \frac{1}{T} \int \frac{R_L(NBH)^2 \dot{y}^2}{(R_L + R_C)^2} dt, \quad \text{(Eq. 1.8)}$$

and $$\eta_E = \frac{2P_E}{\rho U^3 D L \eta} \quad \text{(Eq. 1.9)}$$

The oscillation velocity of the galloping body, $\dot{y}$, depends on the mechanical properties (mass, stiffness and damping) and on the cross-sectional shape of the galloping body, on the damping introduced by the generator and on the velocity of the incident liquid flow (see Eq. 1.2).

It should be noted that the total damping $\xi_T$ of the system corresponds to the damping of the system without connecting the generator $\xi$ plus the damping introduced by the generator $\xi_G$, which is given by:

$$\xi_G = \frac{(NBH)^2}{[2m\omega_N(R_L + R_C)]}$$

The equations 1.8 and 1.9 above show the significance of controlling the resistance (load) of the generator in order to improve the performance of the energy converter.

In preferred embodiments, a control system may be incorporated for controlling RL to generally improve the production of electricity, particularly in the case of variable incident liquid flow. Such a control system may include at least one sensor for measuring the velocity of the incident liquid flow. This sensor could be of any suitable type and may be e.g a propeller type flow meter.

The equation 1.8 leads to the following equation:

$$P_E = \frac{R_L(NBH)^2 A^{*2} \omega_N^2 D^2}{2(R_L + R_C)^2}, \quad \text{(Eq. 1.10)}$$

wherein

A* can be determined from Eq. 1.2, in which it should be taken into account that the damping coefficient is the total damping $\xi_T = \xi + \xi_G$. Eq. 1.10 thus gives a mathematical expression which allows linking the generator resistance (load) to improve/optimize electricity production for a given mechanical and geometric properties of the galloping body and an incident liquid flow velocity. (It is noted that to this end, the maximum of $P_E$ may be found by differentiating $P_E$ with respect to $R_L$ and finding the optimum $R_L$ by equating the differentiated function with zero).

Additionally, previous equations 1.2, 1.3 and 1.4 give a basis for determining a design of an energy converter for a given liquid flow (which may be a marine flow associated with tidal flow or a river flow), by appropriately choosing the mechanical and geometric properties of the galloping body, as well as the characteristics of the generator in order to achieve high energy conversion.

It is also noted that in some embodiments, instead of or in addition to varying the generator load (resistance), also the stiffness of the elastic means may be adapted. In these embodiments, the elastic means connecting the galloping body to the support may incorporate e.g. electrorheological or magnetorheological systems to be able to adapt the stiffness of the elastic means.

Figure 4:
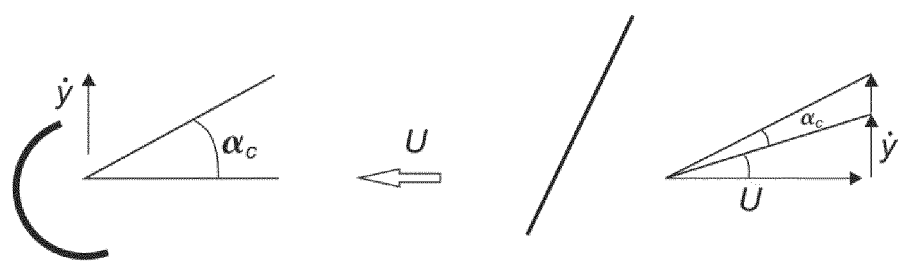
FIG. 4 serves to illustrate a method of controlling an angle of attack of a galloping body according to an example of the present invention.

FIG. 4 serves to schematically illustrate a method of controlling an angle of attack of a galloping body according to an example of the present invention. In some embodiments, an active attitude (pitch) control of a part of the galloping body may be incorporated.

Based on extensive testing in a re-circulating water channel, the inventors have found that galloping may be significantly enhanced by substantially continuously changing the angle of attack of the galloping body (e.g. a prism). It has been found that the oscillations may be increased both in terms of amplitude and frequency.

The optimal law to vary the angle of attack is a function of the oscillation of the prism is given by $$\alpha_c(t) = c_1 \tan^{-1}(\dot{y}/U) \quad \text{(Eq. 1.11)}$$

so that the effective angle of attack is given by $$\alpha(t) = (1+c_1)\tan^{-1}(\dot{y}/U). \quad \text{(Eq. 1.12)}$$

For $U^* < 1.3$, $c_1 = 0.5$ and for larger values of $U^* c_1 = 0.3$. $\dot{y}$ is the oscillation velocity of the prism and U is the incident flow velocity. $\alpha_c = 0$ stands for the situation where there is no actuation.

Figure 5:
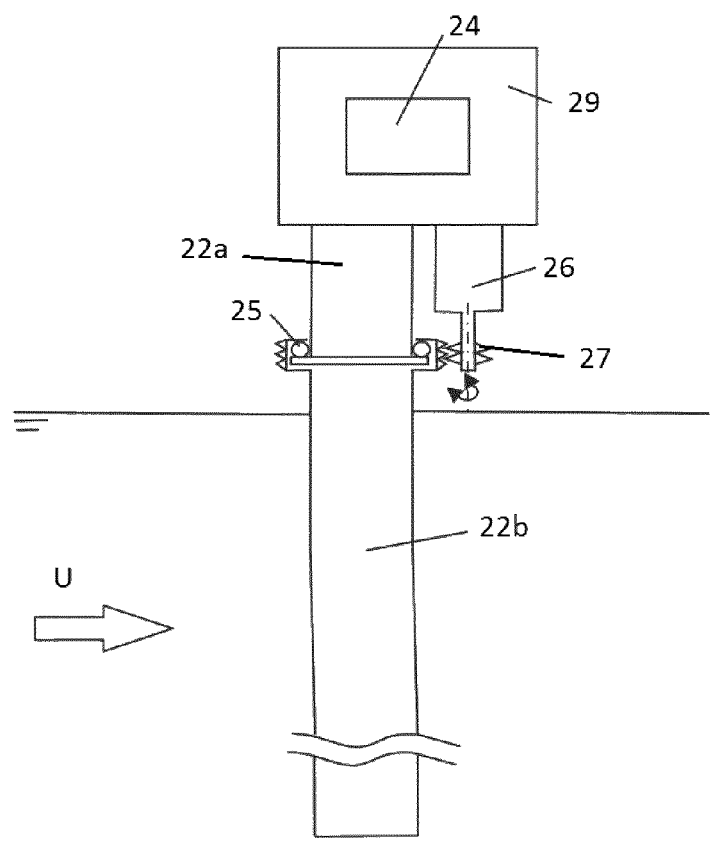
FIG. 5 illustrates a further example of an energy converter according to the present invention.

FIG. 5 schematically illustrates a further example of an energy converter. In this example, a pitch control of a galloping body is incorporated. In FIG. 5, reference sign U refers to the incident liquid flow. A galloping body (prism) 22 is substantially vertically arranged and in this example comprises an upper part 22a and a lower part 22b. The upper part 22a may be arranged substantially outside the body of liquid and may be guided along a horizontal guide. The lower part 22b necessarily extends into the body of liquid. The lower part 22b is rotatably mounted on the upper part 22a.

A pitch control is incorporated in this example to actively control the angle of attack of the galloping body at any given moment. The pitch control may comprise a servomotor 26 (with or without suitable reduction gearing) to drive an actuator 27. The actuator 27 may be a pinion which meshes with an annular gear arranged on the lower part 22b of the galloping body. By driving the pinion, the lower part 22b rotates about the upper part 22a and the angle of attack of the incident liquid flow may be actively controlled. In another example, rotational actuation can be achieved by other suitable techniques, such as e.g. hydraulic actuators.

Another aspect of such a pitch control system is that it may adjust the galloping body to changes in the flow direction (e.g. tidal flow).

Reference sign 24 refers to the schematically illustrated substantially horizontal guide guiding the galloping body 22 and reference sign 29 indicates a part of the support of the energy converter which incorporates the guide 24.

Figure 6:
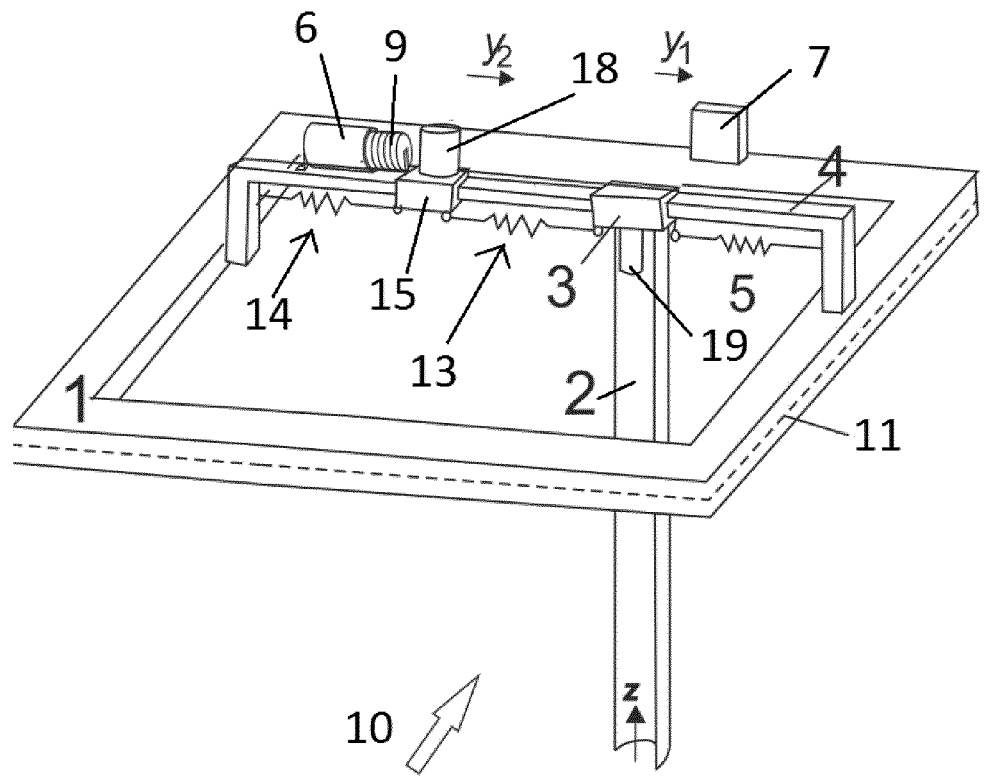
FIG. 6 schematically illustrates yet a further example of an energy converter according to the present invention.

FIG. 6 schematically illustrates a further example of an energy converter. A galloping body 2 in the shape of a prism having an "open C" cross-section may be substantially vertically suspended from a part of a support 1 such that at least a bottom part of the galloping body extends into a body of liquid. An incident liquid flow is indicated by reference sign 10. The mean liquid level is indicated by reference sign 11. In the case of an energy converter at sea, reference sign 11 may be understood as the Mean Sea Level (MSL).

A horizontal guide 4 is arranged outside the body of liquid. As in a previously illustrated example, a kart 3 may be guided along the horizontal guide and may be connected to the support structure by a first spring 5. As in a previous example, a control system 7 may be incorporated, which on the basis of suitable measurements may control e.g. the resistance (load) of generator 6 and/or the stiffness of one or more of the various springs (5, 13, and 14) and/or an angle of attack of galloping body 2. Very schematically illustrated in FIG. 6 is a pitch control 19 able to rotate the galloping body 2.

The control may be based on measurements of the incident liquid flow, and the position and/or velocity of the galloping body.

Contrary to the previously shown example, the kart 3 does not directly drive the generator. Instead, an operative connection through spring 13 is provided with a second body 15. The second body 15 may carry permanent magnets 18. Movement of the second body 15 leads to a displacement of the permanent magnets 18 with respect to coil 9 belonging to the generator 6. In an alternative arrangement, the location of permanent magnets and coils may be interchanged, i.e. the second body may carry one or more coils and the generator stator may incorporate permanent magnets.

Reference signs $y_1$ and $y_2$ refer to the horizontal oscillations of the galloping body 2 (with kart 3) and the second body 15 respectively. Both these oscillations may in accordance with this example be along the same horizontal guide 4.

Also in this figure, the generator has only been very schematically illustrated and it will be clear that also in this example, the generator may be e.g. a linear or a rotary generator. In case of a rotary generator, a suitable transmission for converting the oscillating motion to rotation may be included.

Also in this example, the only parts of the energy converter that are in contact with the body of liquid are the galloping body 2 and the support 1. The generator 6, the second body 15, kart 3, horizontal guide 4 and elastic means 3, 14 and 15 do not need to be in contact with the liquid. This may extend the life of the energy converter and reduce operating costs as wear and tear may be reduced. It may also facilitate maintenance of these components.

Also in this example, the inside of the prism (galloping body) may be hollow and it a substantially flat end-plate could be provided at the second end of the prism.

During testing in a water channel, the inventors have found that by appropriately choosing the mass of the second body and the stiffness of the springs 5, 13 and 14, the production of electricity may be improved. Furthermore, by incorporating a second body, the bandwidth of suitable liquid flow velocities where efficiency is significant can be increased.

Testing of Different Designs

Experiments have been carried out in a re-circulated water channel with a spring-mounted prism. Active control was implemented in order to act in real time on the attitude of the prism. Efficiency η may be defined as the flux energy of flow across the transverse dimension of the prism $\eta=2P/(\rho U^3 DL)$, where P is the power extracted to the flow, ρ is the density of the liquid flow, U is the velocity of the liquid flow, D is the transverse dimension of the prism, and L is the submerged length of the prism.

Figure 7:
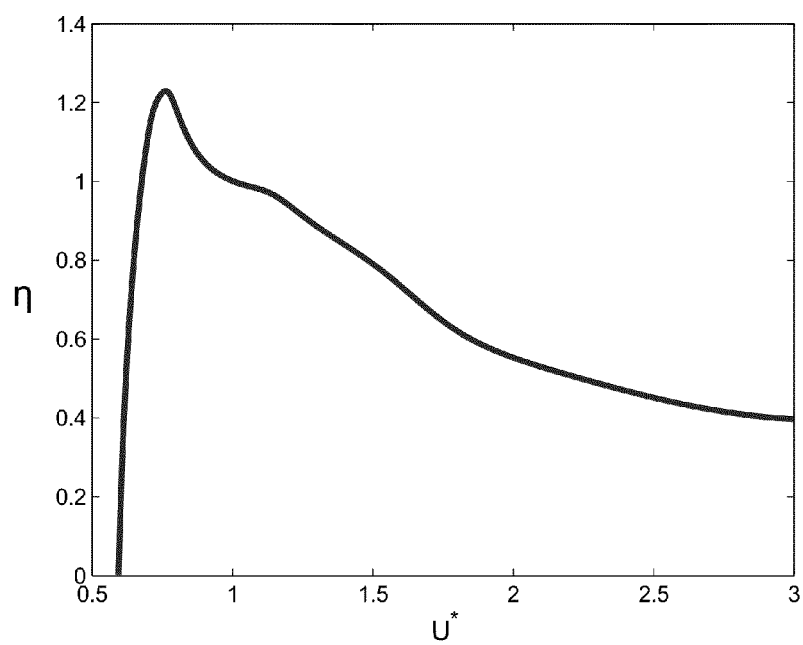
FIG. 7 is a graph illustrating experimental results of efficiency as measured by the inventors.

FIG. 7 is a graph illustrating experimental results of efficiency measured by the authors as a function of the reduced velocity U*.

Under optimal conditions values of η around 1.2 have been measured (note that η is defined with reference to dimension D and therefore can take values higher than 1).

If one considers the efficiency as the flux energy of flow across the transverse dimension covered by the prism during its oscillation, one has to introduce $$C_p=\eta/(1+2A^*), \text{ wherein } A^*=y_{max}/D.$$

Under optimal conditions values of $C_p$=0.43 have been measured (a figure of 0.39 may be used when the energy use of the servomotor is subtracted).

Furthermore, particularly when incorporating a second body, the bandwidth of suitable flow velocities may be increased and the device may be operating efficiently over a large range of flow velocities.

In the experiments, different shapes/cross-sections of the prism were tested such as e.g. triangular, rectangular, closed semi-circle and open semi-circle ("C-shape"). The submerged length of the prism in the experiments was 87 cm and the prisms were made of steel. The galloping body was connected to the support structure on each side with a helicoidal spring having a stiffness of 170 N/m. The first end of the galloping body was arranged to be guided along the horizontal guide using rolling element bearings.

During the experiments, the parameter m*.ξ was controlled. m* is the ratio between the density of the liquid and the density of the galloping body, and ξ is an non-dimensional mechanical damping coefficient of the galloping body.

Figure 8:
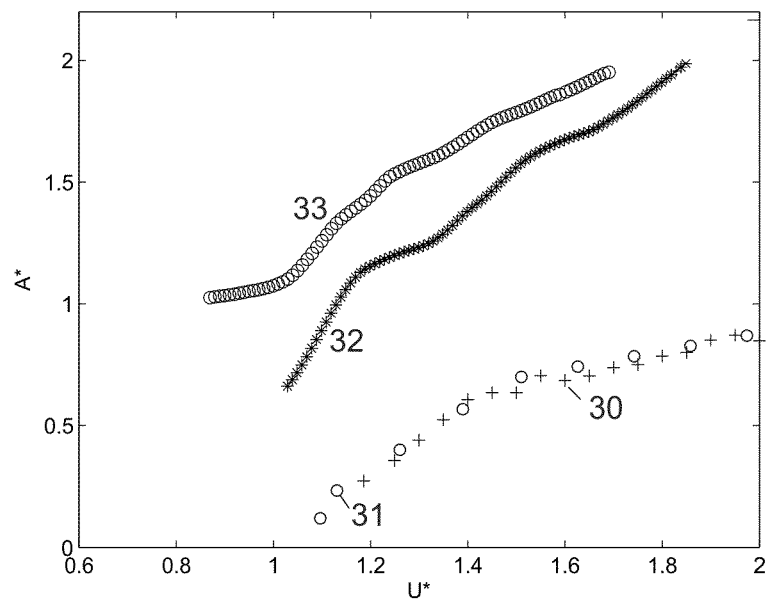
FIG. 8 is a graph illustrating experimental results which provides an illustration of the effect of active control of pitch in a galloping body on the energy conversion efficiency.

Referring now to FIG. 8, a plot is provided with experimental results obtained by the inventors which demonstrate the effect of active attitude control (pitch) in the galloping body (prism) on oscillations. Data from classical experiments of Bouclin (*Hydroelastic oscillations of square cylinders, Bouclin, University of British Columbia* 1977) are given (reference sign 30, the plus signs) as well as data measured independently by the inventors in their water channel (reference sign 31, the small circles). The data of the experimental tests by the inventors in this case also refer to square cylinders, just as in the experiments carried out by Bouclin.

FIG. 8 shows the normalized amplitude of oscillations A* as a function of the reduced velocity U*. Superimposed on those data, experimental results obtained for an open semi-circular cross-section (type C) without control in pitch (reference sign 32) and with control in pitch (reference sign 33) are also given. Since A* is closely related to the energy transfer from the flow to the galloping body it can be observed that the open semicircular cross-section "captures" more energy from the flow and, even more, when active control with appropriate law control is carried out (in this case, the observed frequency of oscillations is also higher).

In these experiments, the same setup was used as previously described. For the square cylinders (reference sign 31), the parameter m*.ξ was equal to 0.04. For the tests having a galloping body with an "open C" cross-section, the same parameter had a value of approximately 0.6. Other features of examples of the present invention have further improved the extraction of energy from transverse galloping in various ways.

Table 1 below shows, as a matter of example, characteristic dimensions of a single prism used in examples of energy converters of small/medium/large size as well as the expected energy capture in a water current of 2 m/s at the optimum design point. Designs including the small prism size are mainly devised for small estuaries or rivers with little depth in mind. Medium size devices may be mainly devised for near shore marine tidal currents or rivers. Energy converters according to the large prism size may be devised for steady marine currents.

|  | Small Prism size | Medium Prism size | Large Prism size |
|---|---|---|---|
| D (m) | 1 | 2 | 4 |
| L (m) | 4 | 8 | 16 |
| P (kW) | 19.2 | 76.8 | 307.2 |
| η | 1.2 | 1.2 | 1.2 |
| $C_p$ | 0.39 | 0.39 | 0.39 |
| K (N/m) | 2665 | 2678 | 2685 |
| ξ | 3.9 | 7.8 | 15.6 |
| M (kg/m) | 122.1 | 245.4 | 491.9 |
| Cross-section of prism | Open C-shape | Open C-shape | Open C-shape |
| Generator type | Rotary or linear, synchronous or asynchronous, optionally permanent magnets | Rotary or linear, synchronous or asynchronous, optionally permanent magnets | Rotary or linear, synchronous or asynchronous, optionally permanent magnets |
| Pitch control | yes | yes | Yes |

Herein K refers to the spring stiffness and ξ refers to the damping introduced by coupling to the generator. Finally, M is the mass per unit length of the prism.

It will be clear that in accordance with local conditions (depth, currents, waves, etc.) alternative dimensions for the galloping body may be used.

It has also been found that suitable control of the angle of attack of the galloping body may lead to conversion efficiencies as high as for rotary wing conversion systems (i.e. marine current turbines). It should be noted however that energy converters according to examples of the present invention may be significantly cheaper in manufacture (the shape of the mechanical element of energy capture is significantly simpler, type C (half-tube or "open semi-circle"), compared to that of a twisted-blade) and in use (maintenance costs may be lowered since all mechanical and electrical parts, except for the galloping body, are installed above the water surface).

Energy converters may be designed in accordance with the conditions on each site (including e.g. bathymetry, waves, flow velocities, etc.) optimizing the ratio costs/production.

The support structure (e.g. platform) and the galloping bodies may be manufactured using steel, but may have a relatively low steel consumption compared to horizontal axis water current turbines. This allows the capital expenditure (CAPEX) to be reduced. The manufacturing techniques used to manufacture the energy converters according to various examples of the invention are all well known ("proven technology") and it is foreseen that no special shipyard, dock or any other special facility will be needed. Nor does it appear necessary to use special vessels for commissioning and/or decommissioning operations.

Power components may conveniently be located above a water surface and may relatively easily be protected in order to reduce corrosion. The main components are thus relatively easily accessible when maintenance is required. No underwater operations will be required, and neither are special vessels or highly qualified personnel. This thus allows minimizing maintenance costs. The support structure may be made stable enough to ensure easy accessibility. Stability will also improve time windows available for maintenance operations taking into account weather conditions.

In terms of performance, energy production in experiments exceeds results obtained by exploiting other flow induced vibrations, such as e.g. Vortex-Induced Vibrations (VIV) or Flutter. Energy densities expressed in W/m$^3$ have also been found to be competitive with conventional horizontal axis current turbines.

Considering foreseen costs and device performance, the final cost of electricity generated by examples of the present invention may be low enough to compete with any other offshore renewable technology in the state of the art.

Figure 9:
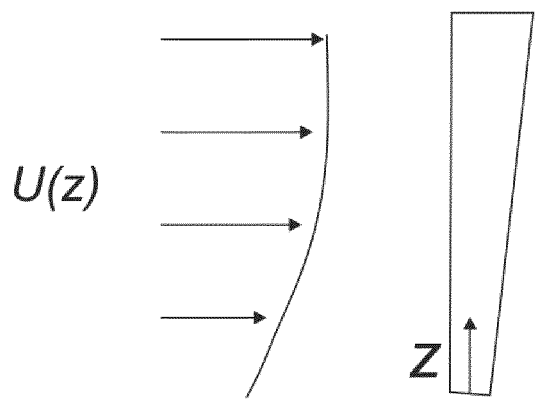
FIG. 9 illustrates an example of a galloping body with variable cross-section according to an embodiment of the present invention.
Figure 9:

FIG. 9 illustrates an example of a galloping body with a variable cross-section according to an embodiment of the present invention. FIG. 9 serves to illustrate that within a body of liquid (e.g. sea or river) the velocity of flow may not be uniform along the height z (or along the length L of the part of the galloping body extending into the body of liquid).

As the flow velocity changes as a function of z, the cross-section of the galloping body may also vary. The cross-section may have substantially the same form/shape along the length of the galloping body, but the dimensions may be varied. In some examples, the dimensions may be varied linearly. By suitable varying the dimensions, the contribution of each section of the galloping body to the galloping motion (and energy transfer) may be substantially the same.

In an example, $$U^*(z) = \frac{U(z)}{\omega_N D(z)}$$

may be equal to a constant.

Figure 10:
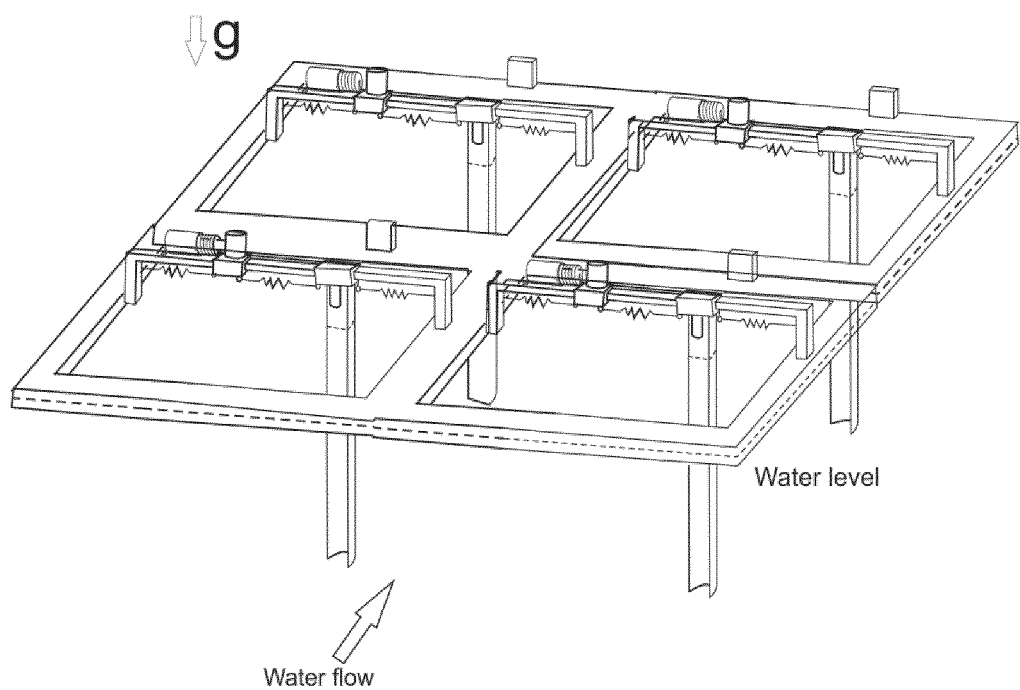
FIG. 10 illustrates an energy conversion system according to an example of the present invention.

FIG. 10 schematically illustrates an energy conversion system comprising a single support incorporating a plurality of energy converters such as described with reference to FIG. 6. Experiments carried out by authors suggest that it may be beneficial to maintain the transverse distance between galloping bodies at at least 2×D (D being a characteristic dimension of the galloping body, e.g. the width) and to maintain the in-line distance (i.e. the distance between two galloping bodies in flow direction) at at least 2×D.

FIG. 10 also serves to illustrate that the energy conversion systems according to different examples of the present invention may relatively easily be scaled. In FIG. 10, each of the individual energy converters shown is substantially the same. However, there is need to have identical energy converters in a single energy conversion system. Depending on the local fluid flow it may be beneficial to employ different energy converters at the different positions within the energy conversion system, e.g. employ a different energy converter on a downstream row than an upstream row. Alternatively, energy converters which may be closer to the edges of a liquid body (e.g. a river) may be different from more centrally located converters.

It may be beneficial to employ different cross-section shape and size for each galloping body as a function of its relative position with the others. In addition, the mass of each galloping body can also be different and it may be beneficial to apply an individualized control law in pitch for each galloping body.

In FIG. 10, each of the energy converters is schematically shown to comprise an individual control system. However, in alternative implementations, a control system controlling a plurality or all of the energy converters may be employed.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. An energy converter for converting kinetic energy from a flow in a body of liquid by transverse galloping, comprising:
    a support,
    an elongate galloping body having a top end and a bottom end and being of a cross-section satisfying the Den Hartog criterion suitable for transverse galloping,
    a substantially horizontal guide arranged outside the body of liquid for guiding the top end of the galloping body in a transverse galloping movement,
    one or more elastic elements substantially horizontally arranged and connected between the galloping body and the support, and
    a generator comprising a static generator component and a dynamic generator component, and wherein
    the galloping body is substantially vertically suspended such that the bottom end of the body extends into the body of liquid, and
    the dynamic generator component is operationally connected to the galloping body.

2. The energy converter according to claim 1, wherein the support is floating in the body of liquid when in use.

3. The energy converter according to claim 1, wherein the support is fixed when in use.

4. The energy converter according to claim 1, wherein the dynamic generator component is integrally formed with or attached to the galloping body.

5. The energy converter according to claim 1, wherein the dynamic generator component is integrally formed with or attached to a second body connected to the support by one or more elastic elements.

6. The energy converter according to claim 1, wherein at least a part of the galloping body is rotatable around a longitudinal axis of the galloping body and the energy converter further comprises an actuator for rotating the rotatable part.

7. The energy converter according to claim 6, wherein the galloping body comprises an upper part including the top end, and a lower part including the bottom end, and wherein the lower part is rotatably mounted about the upper part.

8. The energy converter according to claim 1, wherein the galloping body is substantially hollow.

9. The energy converter according to claim 1, wherein the galloping body further comprises an end-plate at the bottom end.

10. The energy converter according to claim 1, wherein a cross section of the galloping body is variable between the top end and the bottom end.

11. The energy converter according to claim 10, wherein a shape of the cross-section of the galloping body is substantially constant between the top end and the bottom end, but the cross-section has variable dimensions.

12. The energy converter according to claim 1, wherein a cross-section of the galloping body substantially has a C-shape.

13. The energy converter according to claim 1, wherein an electromagnetic force applied by the generator to the galloping body is adaptable.

14. The energy conversion system comprising a plurality of the energy converters according to claim 1.

15. An energy converter for converting kinetic energy from a flow in a body of liquid by transverse galloping, comprising:
    a support,
    an elongate galloping body extending between a top end and a bottom end and being of a cross-section satisfying the Den Hartog criterion suitable for transverse galloping, and at least a part of the galloping body is rotatable around a longitudinal axis of the galloping body,
    a substantially horizontal guide arranged outside the body of liquid for guiding the top end of the galloping body,
    one or more elastic elements substantially horizontally arranged and connected between the galloping body and the support,
    an actuator for rotating the rotatable part of the galloping body,
    a generator comprising a static generator component and a dynamic generator component, and wherein
    the galloping body is substantially vertically suspended such that the bottom end of the body extends into the body of liquid, and
    the dynamic generator component is operationally connected to the galloping body, and wherein
    the energy converter further comprises a pitch control system for sending commands to the actuator, wherein the commands are based on measurements of the position and/or velocity of the galloping body and velocity of the flow.

16. A method for converting kinetic energy from a flow in a body of liquid by transverse galloping, comprising:
    providing an energy converter in the body of liquid, wherein the energy converter comprises
    a support,
    an elongate galloping body extending between a first end and a second end and being of a cross-section satisfying the Den Hartog criterion suitable for transverse galloping,
    a substantially horizontal guide arranged outside the body of liquid for guiding the first end of the galloping body,
    one or more elastic elements substantially horizontally arranged and connected between the galloping body and the support, and
    a generator comprising a static generator component and a dynamic generator component, and wherein the galloping body is substantially vertically suspended such that the second end of the body extends into the body of liquid, and wherein
the dynamic generator component is operationally connected to the galloping body and wherein the body of liquid has a flow speed above a critical flow speed of the energy converter.

17. The method according to claim 16, further comprising measuring the flow speed of the body of liquid; and
varying a resistance of the generator based at least partially on the measured flow speed.

18. The method according to claim 17, further comprising varying a stiffness of the elastic elements based at least partially on the measured flow speed.

19. The method according to claim 16, further comprising varying an angle of attack of the galloping body.

20. The method according to claim 19, wherein the angle of attack of the galloping body is varied as a function of a horizontal velocity of the galloping body.

* * * * *